United States Patent
Badr

(10) Patent No.: US 12,368,607 B2
(45) Date of Patent: Jul. 22, 2025

(54) IDENTITY MANAGEMENT FOR WEB2 AND WEB3 ENVIRONMENTS

(71) Applicant: Google LLC, Mountain View, CA (US)

(72) Inventor: Ibrahim Badr, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 309 days.

(21) Appl. No.: 18/076,634

(22) Filed: Dec. 7, 2022

(65) Prior Publication Data
US 2024/0048397 A1  Feb. 8, 2024

Related U.S. Application Data

(60) Provisional application No. 63/394,775, filed on Aug. 3, 2022.

(51) Int. Cl.
| | | |
|---|---|---|
| H04L 29/06 | (2006.01) | |
| G06F 21/00 | (2013.01) | |
| H04L 9/00 | (2022.01) | |
| H04L 9/14 | (2006.01) | |
| H04L 9/40 | (2022.01) | |

(52) U.S. Cl.
CPC .................. *H04L 9/50* (2022.05); *H04L 9/14* (2013.01); *H04L 63/102* (2013.01)

(58) Field of Classification Search
CPC . H04L 9/50; H04L 9/14; H04L 63/102; H04L 2209/56
See application file for complete search history.

(56) References Cited

U.S. PATENT DOCUMENTS

| | | | |
|---|---|---|---|
| 2018/0262485 A1* | 9/2018 | Roth | H04L 63/0807 |
| 2023/0289806 A1* | 9/2023 | Agrawal | G06Q 20/065 |
| 2023/0376941 A1* | 11/2023 | Jin | G06Q 20/4014 |

FOREIGN PATENT DOCUMENTS

KR  20170141976 A  * 12/2017

* cited by examiner

*Primary Examiner* — Lisa C Lewis
(74) *Attorney, Agent, or Firm* — DORITY & MANNING, P.A.

(57) ABSTRACT

Systems and methods for profile management across Web2 and Web3 environments can include a user profile database. The user profile database can store a plurality of keys associated with a plurality of blockchains. The systems and methods can process a user verification request, determine a particular blockchain associated with the user verification request, determine a particular key associated with the particular blockchain, and provide the particular key to the particular blockchain.

10 Claims, 12 Drawing Sheets

800

802 OBTAIN A USER VERIFICATION REQUEST

804 OBTAIN USER PROFILE DATA BASED ON THE USER VERIFICATION REQUEST

806 PROCESS THE USER PROFILE DATA TO DETERMINE A PARTICULAR KEY ASSOCIATED WITH THE PARTICULAR BLOCKCHAIN AND PROVIDE THE PARTICULAR KEY TO A BLOCKCHAIN COMPUTING SYSTEM

808 OBTAIN ONE OR MORE USER INPUTS AND DETERMINE THE ONE OR MORE USER INPUTS ARE ASSOCIATED A BLOCKCHAIN TRANSACTION REQUEST

810 PROVIDE THE BLOCKCHAIN TRANSACTION REQUEST TO THE BLOCKCHAIN COMPUTING SYSTEM

812 OBTAIN TRANSACTION DATA IN RESPONSE TO PROVIDING THE PARTICULAR KEY AND THE BLOCKCHAIN TRANSACTION REQUEST

Figure 8

IDENTITY MANAGEMENT FOR WEB2 AND WEB3 ENVIRONMENTS

RELATED APPLICATIONS

This application claims priority to and the benefit of U.S. Provisional Patent Application No. 63/394,775, filed Aug. 3, 2022. U.S. Provisional Patent Application No. 63/394,775 is hereby incorporated by reference in its entirety.

FIELD

The present disclosure relates generally to identity management for a plurality of accounts including accounts associated with different blockchain environments. More particularly, the present disclosure relates to a profile management system that facilitates user-specific access to a plurality of platforms with a plurality of different platform specific accounts managed based on a singular management profile.

BACKGROUND

A user can have a plurality of different profiles with a plurality of different login criteria. Therefore, a user may have to remember and/or store a large variety of datasets that may be associated with a large variety of different platforms. Additionally, the creation of the different accounts can be tedious and at times redundant.

The introduction of Web3 environments can add an additional hurdle as the login procedures can differ from the login procedures of a Web2 environment. The login verification for blockchain platforms can be difficult, and the various blockchain wallets may be difficult to manage.

SUMMARY

Aspects and advantages of embodiments of the present disclosure will be set forth in part in the following description, or can be learned from the description, or can be learned through practice of the embodiments.

One example aspect of the present disclosure is directed to a computing system. The system can include one or more processors and one or more non-transitory computer-readable media that collectively store instructions that, when executed by the one or more processors, cause the computing system to perform operations. The operations can include obtaining a user verification request. The user verification request can be associated with a particular blockchain of a plurality of different blockchains. The operations can include obtaining user profile data based on the user verification request. The user profile data can be associated with a particular user. In some implementations, the user profile data can include a plurality of keys associated with the plurality of different blockchains. The operations can include determining a particular key of the plurality of keys associated with the particular blockchain. The operations can include providing the particular key to a blockchain computing system. The blockchain computing system can be associated with the particular blockchain.

Another example aspect of the present disclosure is directed to a computer-implemented method. The method can include obtaining, by a computing system including one or more processors, a user verification request. The user verification request can be associated with a particular blockchain. The method can include obtaining, by the computing system, user profile data based on the user verification request. The user profile data can be associated with a particular user. In some implementations, the user profile data can include a plurality of identification datasets associated with the plurality of different web platforms. The method can include processing, by the computing system, the user profile data to determine a particular key associated with the particular blockchain. The method can include providing, by the computing system, the particular key to a blockchain computing system. The blockchain computing system can be associated with the particular blockchain.

Another example aspect of the present disclosure is directed to one or more non-transitory computer-readable media that collectively store instructions that, when executed by one or more computing devices, cause the one or more computing devices to perform operations. The operations can include obtaining a user verification request. The user verification request can be associated with a particular blockchain of a plurality of different blockchains. The operations can include obtaining user profile data based on the user verification request. In some implementations, the user profile data can be associated with a particular user. The user profile data can be managed with a profile management extension. The user profile data can include a plurality of blockchain profile datasets associated with the plurality of different blockchains. The operations can include processing the user profile data to determine a particular key associated with the particular blockchain. In some implementations, the particular key can be associated with a particular blockchain profile dataset of the plurality of blockchain profile datasets. The operations can include providing the particular key to a blockchain computing system. The blockchain computing system can be associated with the particular blockchain.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 8 depicts a flow chart diagram of an example method to perform transaction authorization according to example embodiments of the present disclosure.

Figure 1A:
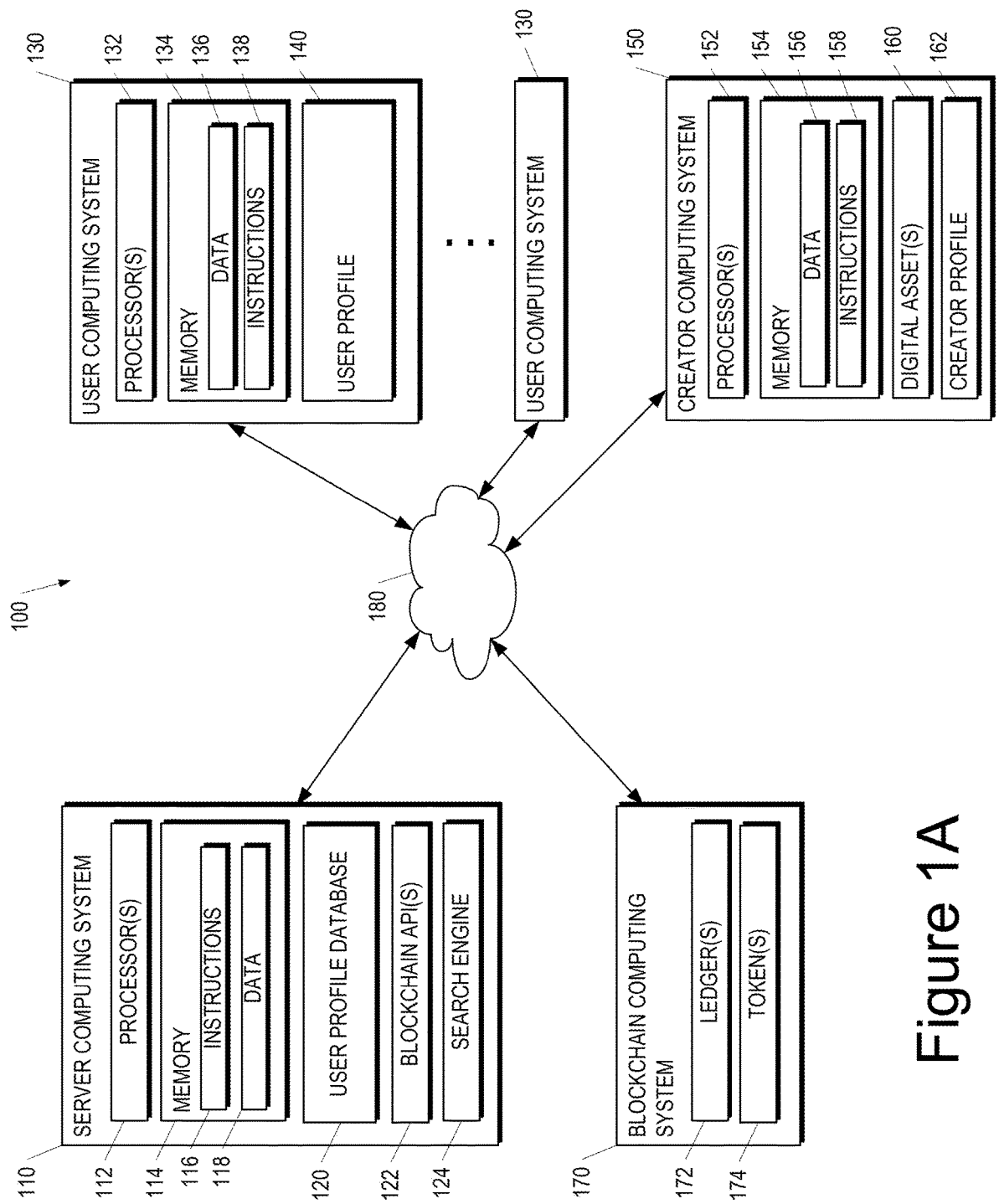
FIG. 1A depicts a block diagram of an example computing system that performs identity management according to example embodiments of the present disclosure.

Reference numerals that are repeated across plural figures are intended to identify the same features in various implementations.

DETAILED DESCRIPTION

Overview

Generally, the present disclosure is directed to systems and methods for identity management for blockchain interactions. In particular, the systems and methods disclosed herein can leverage a profile management system for managing a plurality of keys (e.g., private keys and/or public keys). For example, the systems and methods can utilize the profile management system to interact with a plurality of different blockchains and/or Web2 platforms.

The systems and methods can leverage web identities on different blockchains. In some implementations, the systems and methods can link a plurality of different accounts under a single profile. For example, the profile can be utilized for logging into different blockchains.

In some implementations, the systems and methods can include a central identity management for Web2 and Web3. The central identity management can manage public keys and/or private keys.

For example, the systems and methods can include obtaining a user verification request. The user verification request can be associated with a particular blockchain of a plurality of different blockchains. User profile data can be obtained based on the user verification request. The user profile data can be associated with a particular user. In some implementations, the user profile data can include a plurality of keys associated with the plurality of different blockchains. The systems and methods can include determining a particular key of the plurality of keys associated with the particular blockchain. The particular key can be provided to a blockchain computing system. The blockchain computing system can be associated with the particular blockchain.

In particular, the systems and methods disclosed herein can leverage a profile management system to provide an intermediary system that can interface with a plurality of different Web2 and Web3 platforms. The profile management system can include a database of management profiles, and each management profile can be associated with one or more account profiles such that a user can log into the management profile to interact with each of their one or more account profiles. The account profile data may be manually input by the user. Alternatively and/or additionally, a user may log into and/or generate a management profile. The user can then input one or more selections to the profile management system. The profile management system can then interface with an account interface of a third party computing system in order to generate an account with the third party web platform. Data associated with the account can then be stored in the database of the profile management system to provide seamless access to the third party web platform.

In some implementations, the profile management system can utilize the management profile to obtain data associated with a plurality of non-fungible tokens associated with the user to provide a centralized interface for viewing and/or interacting with the plurality of non-fungible tokens for the tokens on a plurality of different blockchains. The centralization of the non-fungible token data points can allow for the data to be utilized for providing more user-specific experience for search predictions and suggestions.

The systems and methods can obtain a user verification request. The user verification request can be associated with a particular blockchain of a plurality of different blockchains. In some implementations, obtaining the user verification request can be based on providing input data to a blockchain computing system. The user verification request can be obtained from a blockchain computing system. Alternatively and/or additionally, the user verification request may be obtained from a blockchain computing system. The user verification request can be descriptive of a request for one or more particular keys associated with a particular blockchain. Additionally and/or alternatively, the user verification request can include a request for account information (e.g., an account ID, a username, an email, a password, a hash, and/or an IP address).

User profile data can then be obtained based on the user verification request. The user profile data can be associated with a particular user. In some implementations, the user profile data can include a plurality of keys associated with the plurality of different blockchains. The user profile data can be stored by a server computing system. In some implementations, the user verification request can be obtained via a web browser application. Additionally and/or alternatively, providing the particular key can include providing the particular key via an application extension. The application extension can be a browser extension that interfaces with a browser application. Alternatively and/or additionally, providing the particular key can include instructing an application programming interface to interface with the particular blockchain. In some implementations, the user profile data can include login information for a plurality of web platforms. The user profile data can be managed by a profile management system that facilitates the storage, retrieval, and transmission of one or more private keys. In some implementations, the plurality of keys can be stored with one or more cryptographic techniques.

In some implementations, obtaining the user profile data based on the user verification request can include accessing a user profile database. The user profile database can include profile information for a plurality of different users. Additionally and/or alternatively, the user profile database can be accessed via a profile management system. The profile management system can include an intermediary system for obtaining user information and interacting with a plurality of different web platforms and/or account services.

The systems and methods can determine a particular key of the plurality of keys associated with the particular blockchain. Determining the particular key can include processing the user profile data to determine a subset of the user profile data that is associated with the particular blockchain. The subset of the user profile data can then be processed to identify the particular key. In some implementations, the determination can be performed by a machine-learned model. Alternatively and/or additionally, the determination can be performed based on one or more deterministic functions and/or heuristics. The identification can be based on the data structure associated with the particular key and/or based on one or more annotations or indexing techniques.

In some implementations, determining the particular key of the plurality of keys associated with the particular blockchain can include determining the particular blockchain based on the user verification request and determining the particular key based on the particular blockchain.

The particular key can be provided to a blockchain computing system. The blockchain computing system can be associated with the particular blockchain. Providing the particular key can include causing an application programming interface to interface with the blockchain computing system.

In some implementations, the systems and methods can include obtaining blockchain data from the blockchain computing system in response to providing the particular key to the blockchain computing system. The blockchain data may be obtained via an application programming interface and/or via a blockchain node.

Alternatively and/or additionally, the systems and methods can include obtaining one or more user inputs. The systems and methods can determine the one or more user inputs are associated with a blockchain transaction request. The blockchain transaction request can be provided to the blockchain computing system. Transaction data can then be obtained in response to providing the particular key and the blockchain transaction request.

The verification request can be obtained in response to a user computing system accessing a Web3 environment. For example, the user verification request can be obtained in response to a user computing system interacting with a web platform. The user verification request can be associated with a particular blockchain. User profile data can be obtained based on the user verification request. The user profile data can be associated with a particular user. In some implementations, the user profile data can include a plurality of identification datasets associated with the plurality of different web platforms. The user profile data can be processed to determine a particular key associated with the particular blockchain. In some implementations, the particular key can be provided to a blockchain computing system. The blockchain computing system can be associated with the particular blockchain.

A user verification request can be obtained from at least one of a user computing system and/or a third party computing system. The user verification request can be associated with a particular blockchain. The user verification request can be associated with a login portal associated with the particular blockchain. In some implementations, the user verification request can be generated based on the detection of one or more input fields in the login portal. The user verification request can be descriptive of a request for an input for each of the one or more input fields.

User profile data can be obtained based on the user verification request. The user profile data can be associated with a particular user. In some implementations, the user profile data can include a plurality of identification datasets associated with the plurality of different web platforms. The plurality of different web platforms can include a plurality of different blockchain platforms. In some implementations, the plurality of different web platforms can include one or more social media platforms. Additionally and/or alternatively, each identification dataset of the plurality of identification datasets can include login information associated with a respective web platform. An identification dataset associated with a blockchain can include one or more keys (e.g., one or more private keys and/or one or more public keys), one or more token IDs, one or more hashes, and/or one or more asset-specific datasets (e.g., data associated with non-fungible tokens and/or cryptocurrency). Additionally and/or alternatively, the user profile data can include an email address and/or other communication data. The email address and/or the other communication data can be leveraged for one or more users to email other users associated with a particular non-fungible token community. The communication data can therefore be leveraged for community building.

In some implementations, a profile management system can provide a communication interface that obtains communication requests from a first user, determines an intended audience, obtains communication data associated with the intended audience (e.g., one or more second users), and provides a communication notification to the intended audience. The communication can be performed without revealing the communication data of the first user or the one or more second users. The profile management system can therefore keep the communication data private, while still allowing users to build a community.

The user profile data can then be processed to determine a particular key associated with the particular blockchain. In some implementations, processing the user profile data to determine the particular key associated with the particular blockchain can include determining a particular identification dataset of the plurality of identification datasets associated with the particular blockchain and obtaining the particular key associated with the particular identification dataset.

The particular key can be provided to a blockchain computing system. The blockchain computing system can be associated with the particular blockchain. The particular key may be a private key. Alternatively and/or additionally, the particular key may be a public key. Providing the particular key can include an intermediary system interfacing with the blockchain as the user interacts with an abstracted (and/or obfuscated) user interface associated with the profile management system.

In some implementations, the systems and methods can transmit a profile generation request to the blockchain computing system. The particular key can be obtained based on the profile generation request. Key context data can then be generated based on the profile generation request. In some implementations, the key context data can be descriptive of the particular blockchain and login information associated with the particular blockchain. The user profile data can then be generated based at least in part on the particular key and the key context data. The user profile data can then be stored.

Additionally and/or alternatively, the systems and methods can include identifying a particular set of data of a plurality of datasets that is associated with a particular blockchain in which the plurality of datasets are associated with a plurality of different blockchains. For example, the systems and methods can obtain a user verification request. The user verification request can be associated with a particular blockchain of a plurality of different blockchains. In some implementations, the systems and methods can include obtaining user profile data based on the user verification request. The user profile data can be associated with a particular user. In some implementations, the user profile data can be managed with a profile management extension. The user profile data can include a plurality of blockchain profile datasets associated with the plurality of different blockchains. The user profile data can be processed to determine a particular key associated with the particular blockchain. The particular key can be associated with a particular blockchain profile dataset of the plurality of blockchain profile datasets. The particular key can be provided to a blockchain computing system. The blockchain computing system can be associated with the particular blockchain.

A user verification request can be obtained in response to one or more user inputs. The user verification request can be associated with a particular blockchain of a plurality of different blockchains. The particular blockchain can be a decentralized and distributed public blockchain for storing smart contracts associated with a plurality of non-fungible tokens.

The systems and methods can obtain user profile data based on the user verification request. The user profile data can be associated with a particular user. In some implementations, the user profile data can be managed with a profile management extension. Additionally and/or alternatively, the user profile data can include a plurality of blockchain profile datasets associated with the plurality of different blockchains. The profile management extension can be a web browser application extension. In some implementations, the profile management extension can be associated with the user profile database. The profile management extension can be associated with one or more application programming interfaces. The one or more application programming interfaces can interact with a user interface of a blockchain interface. Additionally and/or alternatively, the user profile data can include a plurality of crypto wallets. Each of the plurality of crypto wallets can include access data associated with at least one of a cryptocurrency balance or a plurality of non-fungible tokens.

The user profile data can be processed to determine a particular key associated with the particular blockchain. The particular key can be associated with a particular blockchain profile dataset of the plurality of blockchain profile datasets. The particular blockchain profile dataset can include account information associated with the particular blockchain. The account information can include the particular key. Additionally and/or alternatively, the user profile data can include data associated with a plurality of non-fungible tokens associated with a plurality of different blockchains.

The particular key can be provided to a blockchain computing system. The blockchain computing system can be associated with the particular blockchain. Blockchain data can then be obtained in response to providing the particular key. In some implementations, the blockchain data can include information about the Web3 assets of the particular.

In some implementations, Web2 can refer to the state of the internet not interdependent on blockchain technology. For example, email platforms, social media platforms, and/or transaction platforms that do not leverage a blockchain can be part of Web2. Web3 can refer to the applications and other web services that leverage blockchain technology (e.g., decentralized applications that run on the blockchain). Non-fungible tokens and cryptocurrency can be features of Web3.

Additionally and/or alternatively, the one or more keys utilized by the systems and methods disclosed herein can be a set of data (e.g., a number, a hash, and/or a function) that is utilized similar to a password. The one or more keys can be a user indicator to indicate a user's involvement in a transaction and/or in ownership. In some implementations, a private key can be utilized for authenticating a user for accessing transactional assets, and a public key can be utilized to sign transactions and show ownership. The one or more keys can include a string (e.g., a set-size bit string).

The systems and methods of the present disclosure provide a number of technical effects and benefits. As one example, the system and methods can provide systems and methods for providing identity management for a plurality of blockchain identities. For example, the systems and methods disclosed herein can leverage a profile management system to manage the verification of identities for a plurality of different blockchains by managing a plurality of keys.

Another technical benefit of the systems and methods of the present disclosure is the ability to leverage the profile management system to provide an intermediary system for generating a profile for a user who does not currently have an account with the platform. For example, the systems and methods disclosed herein can obtain a request to generate an account with a platform (e.g., a blockchain platform) and the systems and methods can interface with the platform to generate an account in which the account information is then stored in the user profile database.

Another example of technical effect and benefit relates to improved computational efficiency and improvements in the functioning of a computing system. For example, the systems and methods disclosed herein can leverage the profile management system to reduce the number of crypto wallets and/or extensions downloaded in order to interact with a plurality of blockchains.

With reference now to the Figures, example embodiments of the present disclosure will be discussed in further detail.

Example Devices and Systems

FIG. 1A depicts a block diagram of an example computing system 100 that performs identity management according to example embodiments of the present disclosure. The system 100 includes a user computing system 130, a server computing system 110, a creator computing system 150, and a blockchain computing system 170 that are communicatively coupled over a network 180.

The user computing system 130 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the user computing system 130 to perform operations.

The user computing system 130 can also include one or more user input components that receive user input. For example, the user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 110 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 118 and instructions 116 which are executed by the processor 112 to cause the server computing system 110 to perform operations.

In some implementations, the server computing system 110 includes or is otherwise implemented by one or more server computing devices. In instances in which the server computing system 110 includes plural server computing devices, such server computing devices can operate according to sequential computing architectures, parallel computing architectures, or some combination thereof.

The blockchain computing system 170 includes one or more processors and a memory. The one or more processors can be any suitable processing device (e.g., a processor core, a microprocessor, an ASIC, a FPGA, a controller, a microcontroller, etc.) and can be one processor or a plurality of processors that are operatively connected. The memory can include one or more non-transitory computer-readable storage mediums, such as RAM, ROM, EEPROM, EPROM, flash memory devices, magnetic disks, etc., and combinations thereof. The memory can store data and instructions which are executed by the processor to cause the blockchain computing system 170 to perform operations. In some implementations, the blockchain computing system 170 includes or is otherwise implemented by one or more server computing devices.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The computing system 100 can include a number of applications (e.g., applications 1 through N). Each application can be in communication with a central intelligence layer. Example applications can include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can communicate with a central device data layer. The central device data layer can be a centralized repository of data for the computing system 100. In some implementations, the central device data layer can communicate with a number of other components of the computing device, such as, for example, one or more sensors, a context manager, a device state component, and/or additional components. In some implementations, the central device data layer can communicate with each device component using an API (e.g., a private API).

Additionally and/or alternatively, FIG. 1A depicts an exemplary computing system 100 that can be used to implement identity management according to aspects of the present disclosure. The system 100 has a user-server architecture that includes a server 110 that communicates with one or more user computing systems 130 over a network 180. However, the present disclosure can be implemented using other suitable architectures, which can include any number of computing systems communicating over a network 180.

The system 100 includes a server 110, such as, for example, a web server. The server 110 can be one or more computing devices that are implemented as a parallel computing system and/or a distributed computing system. In particular, multiple computing devices can act together as a single server 110. The server 110 can have one or more processor(s) 112 and a memory 114. The server 110 can also include a network interface used to communicate with one or more remote computing devices (e.g., user devices) 130 over a network 180.

The processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by processor(s) 112, including instructions 116 that can be executed by processor(s) 112. The instructions 116 can be any set of instructions that when executed by the processor(s) 112, cause the processor(s) 112 to provide desired functionality.

In particular, the instructions 116 can be executed by the processor(s) 112 to implement index adjustment (e.g., index deduplication). The user profile database 120 can be configured to store a plurality of user profiles associated with a plurality of users utilizing one or more user computing systems 130. In some implementations, the user profile database 120 can be configured to be utilized for facilitating one or more interactions. The facilitation of the one or more interactions can involve the use of a blockchain application programming interface (API) 122 to send data to and receive data from a blockchain computing system 170. For example, a server computing system 110 can utilize the blockchain API 122 to update one or more ledgers 172 of the blockchain computing system 170. The one or more ledgers 172 can be associated with one or more tokens 174. The one or more tokens 174 can include one or more non-fungible tokens, which can include scripts associated with a digital asset (e.g., image data, video data, text data, latent encoding data, domain data, audio data, augmented-reality asset rendering data, and/or virtual-reality asset rendering data). In particular, the script can reference a specific digital asset that is provided for sale. The digital asset can include image data, text data, video data, latent encoding data, a domain name, a virtual property, an augmented-reality asset, a virtual-reality asset (e.g., a virtual-reality environment and/or a virtual-reality object for interaction in an environment), a smart contract, a physical item authentication, etc. In some implementations, the one or more ledgers 172 can be associated with cryptocurrency that can be utilized to make transactions in a physical marketplace and/or a virtual marketplace.

It will be appreciated that the term "element" can refer to computer logic utilized to provide desired functionality. Thus, any element, function, and/or instructions can be implemented in hardware, application specific circuits, firmware and/or software controlling a general purpose processor. In one implementation, the elements or functions are program code files stored on the storage device, loaded into memory and executed by a processor or can be provided from computer program products, for example computer executable instructions, that are stored in a tangible computer-readable storage medium such as RAM, hard disk or optical or magnetic media.

Memory 114 can also include data 118 that can be retrieved, manipulated, created, or stored by processor(s) 112. The data 118 can include search result data, ranking data, image data (e.g., digital maps, satellite images, aerial photographs, street-level photographs, synthetic models, paintings, personal images, portraits, etc.), video data, audio data, text data (e.g., books, articles, blogs, poems, etc.), latent encoding data, blockchain address data, tables, vector data (e.g., vector representations of roads, parcels, buildings, etc.), point of interest data (e.g., locales such as islands, cities, restaurants, hospitals, parks, hotels, and schools), or other data or related information. As an example, the data 118 can be used to access information and data associated with a specific digital asset, website, search result, blockchain, etc.

The data 118 can be stored in one or more databases. The one or more databases can be connected to the server 110 by a high bandwidth LAN or WAN, or can also be connected to server 110 through network 180. The one or more databases can be split up so that they are located in multiple locales.

The server 110 can exchange data with one or more user computing systems 130 over the network 180. Although two user computing systems 130 are illustrated in FIG. 1A, any number of user computing systems 130 can be connected to the server 110 over the network 180. The user computing systems 130 can be any suitable type of computing device, such as a general purpose computer, special purpose computer, navigational device, laptop, desktop, integrated circuit, mobile device, smartphone, tablet, wearable-computing devices, a display with one or more processors coupled thereto and/or embedded therein, or other suitable computing device. Further, the user computing system 130 can be multiple computing devices acting together to perform operations or computing actions.

Similar to server 110, a user computing system 130 can include a processor(s) 132 and a memory 134. The memory 134 can store information accessible by processor(s) 132, including instructions that can be executed by processor(s) and data. As an example, memory 134 can store data 136 and instructions 138.

Instructions 138 can provide instructions for implementing a browser, a non-fungible token purchase, and/or a plurality of other functions. In particular, the user of user computing system 130 can exchange data with server 110 by using the browser to visit a website accessible at a particular web-address. The identity management of the present disclosure can be provided as an element of a user interface of a website and/or application.

The data 136 can include data related to running a specialized application on the user computing system 130. In particular, the specialized application can be used to exchange data with server 110 over the network 180. The data 136 can include user-device-readable code for providing and implementing aspects of the present disclosure. Additionally and/or alternatively, the data 136 can include data related to previously inputted or received data. For example, the data 136 can include data related to past occurrences of the special application.

The user computing system 130 can include various user input devices for receiving information from a user, such as a touch screen, touch pad, data entry keys, speakers, mouse, motion sensor, and/or a microphone suitable for voice recognition. Further, the user computing system 130 can have a display for presenting information, such as a user interface, displaying a digital asset, displaying pop-ups or application elements displayed in an interface, and/or other forms of information.

The user computing system 130 can also include a user profile 140 that can be used to identify a user of the user computing system 130. The user profile 140 can be optionally used by the user to make one or more transactions which can then be recorded on one or more ledgers 172 of the blockchain computing system 170. The user profile 140 can be descriptive of user information, which can include identification numbers and/or payment account information. For example, the user profile 140 can include data associated with a crypto wallet, which may be linked to a browser application via an application extension and/or embedding.

The user computing system 130 can further include a graphics processing unit. Graphics processing unit can be used by processor 132 to index adjustment. In some embodiments, the user computing system 130 performs any and all index adjustment.

The user computing system 130 can include a network interface for communicating with a server 110 over a network 180. Network interface can include any components or configuration suitable for communication with server 110 over network 180, including, for example, one or more ports, transmitters, wireless cards, controllers, physical layer components, or other items for communication according to any currently known or future developed communications protocol or technology.

The network 180 can be any type of communications network, such as a local area network (e.g., intranet), wide area network (e.g., Internet), or some combination thereof. The network 180 can also include a direct connection between a user computing system 130 and the server 110. In general, communication between the server 110 and a user computing system 130 can be carried via network interface using any type of wired and/or wireless connection, using a variety of communication protocols (e.g., TCP/IP, HTTP), encodings or formats (e.g., HTML, XML), and/or protection schemes (e.g., VPN, secure HTTP, SSL).

In some implementations, the exemplary computing system 100 can include one or more creator computing systems 150. The one or more creator computing systems 150 can be utilized for generating images, videos, prose, poetry, audio, etc., which can then be provided for sale. The one or more creator computing systems 150 can include one or more processors 152, which can be utilized to execute one or more operations to implement the systems and methods disclosed herein. The one or more creator computing systems 150 can include one or more memory components 154, which can be utilized to store data 156 and one or more instructions 158. The data 156 can include data related to one or more applications, one or more media datasets, etc. The instructions 158 can include one or more operations for implementing the systems and methods disclosed herein.

The one or more creator computing systems 150 can store data associated with one or more digital assets 160 and/or one or more creator profiles 162. The one or more digital assets 160 can include text data, image data, video data, audio data, latent encoding data, domain data, or a variety of other data formats. The one or more creator profiles 162 can include information associated with one or more "creators" of the one or more digital assets 160. The one or more creator profiles 162 can include identification data, transaction data, and/or crypto wallet data.

Additionally and/or alternatively, the exemplary computing system 100 can include one or more blockchain computing systems 170. The one or more blockchain computing systems 170 can include a plurality of computing devices being utilized for decentralized data storage, such that a plurality of "blocks" can be distributed throughout a network of computing devices to provide a secure system for data storage, which can include one or more ledgers 172 and one or more tokens 174. In some implementations, each of the one or more tokens 174 can be associated with at least a portion of the one or more ledgers 172.

Blockchain can refer to a system configured to securely record information. The blockchain can include a decentralized system that can render changing information extremely difficult. The blockchain can include a digital ledger of transactions that can be duplicated and distributed across a network of computing systems. Each block in the chain can include a number of transactions. When a new transaction occurs on the blockchain, a record of that transaction can be added to every computing device's ledger. The blockchain can be utilized to track the exchange of currency and/or digital assets via the recording of transactions on the digital ledger, which can be propagated throughout the decentralized system. The currency exchanged and tracked via the blockchain computing system 170 can be referred to as cryptocurrency.

The tokens 174 can include one or more non-fungible tokens. The non-fungible tokens can be minted on a blockchain associated with the blockchain computing system 170. A non-fungible token (NFT) can be a certificate of authenticity of a digital asset. NFTs can be non-interchangeable thus making their worth depend on the price anyone may be willing to pay for the asset. NFTs can be printed on blockchains such that their scarcity and authenticity can be maintained. A digital asset can be defined as anything that is stored digitally and can be uniquely identifiable that organizations can use to realize value. Examples of digital assets can include a tweet, a social media comment, documents, audio, images, videos, logos, website domains, slide presentations, spreadsheets, CSS files and formats, executable code, and/or websites.

Figure 1B:
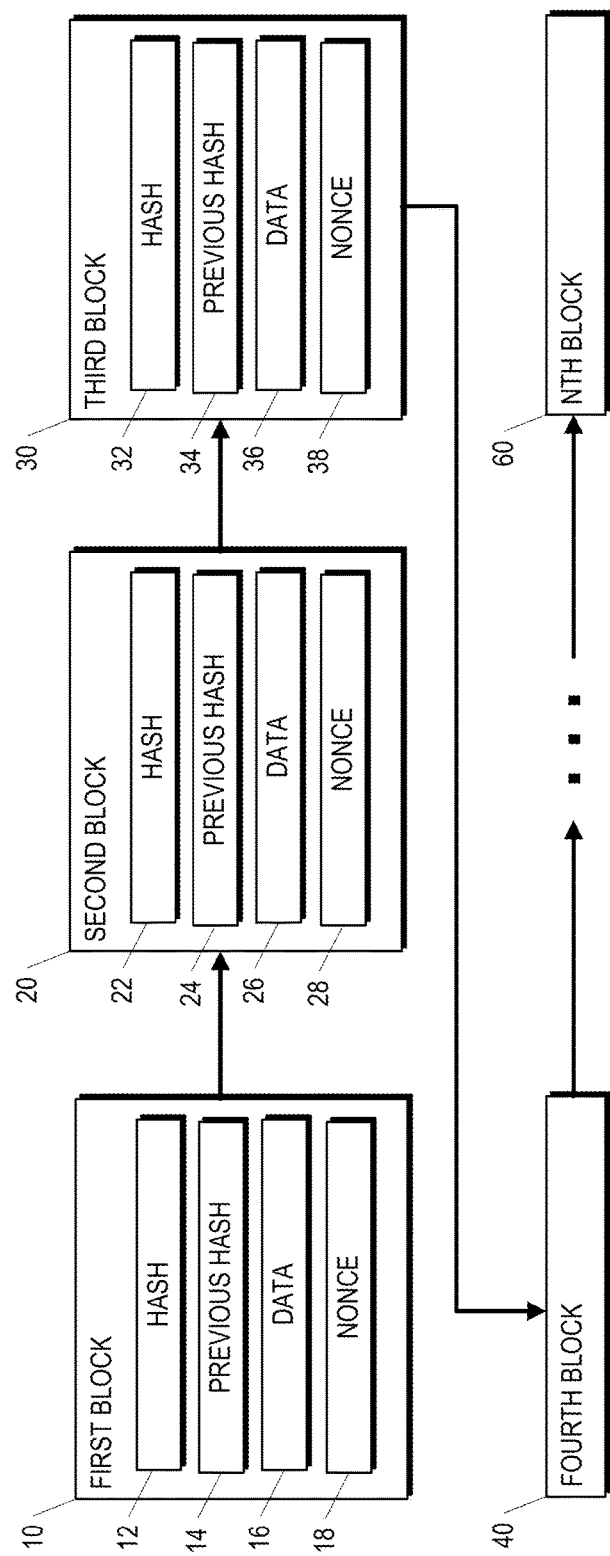
FIG. 1B depicts a block diagram of an example computing device that performs identity management according to example embodiments of the present disclosure.

FIG. 1B depicts a block diagram of an example blockchain 50 that may be utilized by the blockchain computing system 170 of the exemplary computing system 100 of FIG. 1A. The example blockchain 50 can include a plurality of blocks that can be utilized to store data with one or more cryptographic features. The blockchain 50 can be stored on a decentralized computing system comprising a plurality of computing devices. The blockchain 50 can be a public blockchain (e.g., a blockchain that is open without access restrictions such that anyone with an internet access can send transactions or validate transactions as part of the decentralized, distributed system), a private blockchain (e.g., a blockchain that provides access based on permissions set by network administrators), or a hybrid blockchain (e.g., a blockchain with a combination of blocks with no restrictions and blocks with restrictions). The blockchain 50 can include proof of work features that can include one or more cryptographic forms of proof. The proof of work can be provided upon a request to update the blockchain 50 (e.g., a request to update the ledgers based on a new transaction). The proof of work can convey that a certain device or group of devices have performed a certain amount of computation, which can then be validated by other parties. Once validated, the blockchain 50 can be updated, or may remain unchanged in response to a failure to validate. The proof of work feature can be utilized to mitigate the computational cost of every device in the system having to perform the same computational functions and checks for determining a request is valid for updating the blockchain 50.

Each block can include a hash, a previous hash associated with the hash of the previous block, and data. In some implementations, each block can include a nonce. A hash can be a hash value of a fixed length that can be a fingerprint for the particular block. The hash value can be generated based on a hash function and may be changed each time a change is made to the data of that particular block. The previous hash can include a hash value of the block immediately preceding the particular block. The previous hash can be utilized to ensure the downstream ground truth stays unchanged unless proper validation occurs. The data can include transaction data (e.g., a transaction ledger), a timestamp, a value associated with a cryptocurrency value, a non-fungible token (e.g., a non-fungible token including a script that references a digital asset, nonce data, and/or general blockchain data. Nonce (i.e., a number only used once) can be a number added to a block in a blockchain that can meet a difficulty level restriction when a block is rehashed. The nonce can be a number that blockchain miners are solving for, in order to receive an incentive (e.g., cryptocurrency).

The blockchain 50 can include one or more security protocols and/or features. The blockchain 50 can include a cryptographic system. For example, the blockchain 50 can validate the blockchain 50 is valid by ensuring the stored previous hash stored in the block matches the hash value of the previous block from the last block back to the first block (e.g., the genesis block). In some implementations, the blockchain 50 can include proof of work validation that can rely on verifying proof of computation before implementing a change to the stored data (e.g., the stored ledger). Proof of work validation can take seconds, minutes, and/or hours based in part on the number of blocks in the blockchain 50. Additionally and/or alternatively, the blockchain can be implemented on a distributed, decentralized computing system. In some implementations, each computing device in the distributed, decentralized computing system can store a portion of (e.g., a block of the plurality of blocks) or all of the blocks in the blockchain 50. Therefore, the system can verify data by ensuring the data is uniform across most, if not all, of the distributed system. Each node of the distributed system can be checked for tampering before adding new data.

The data can include data associated with a cryptocurrency value (e.g., a ledger associated with a specific cryptocurrency value), data associated with a digital asset (e.g., a non-fungible token minted on the blockchain 50 that can include a script associated with the digital asset), data associated with a smart contract (e.g., a smart contract that includes conditions that automatically initiates an action in response to a criteria being met), and/or timestamp data (e.g., timestamp data for block creation, minting, a transaction, etc.).

In particular, FIG. 1B depicts a first block 10, a second block 20, a third block 30, a fourth block 40, and an nth block 60. Although five blocks are depicted, any number of blocks can be utilized. The first block 10 can be a genesis block (e.g., a first overall block in the blockchain). The first block 10 can include a respective first hash 12 (e.g., a hash value associated with the first block 10). The first block 10 may include a first previous hash 14 (e.g., if the first block 10 has a block before it in the blockchain 50, then the hash of the previous block can be stored on the first block 10). Additionally and/or alternatively, the first block 10 can include data 16 and nonce 18.

The second block 20 can follow the first block 10. The second block 20 can include a respective second hash 22 (e.g., a hash value associated with the second block 20). The second block 20 may include a second previous hash 24 (e.g., the second previous hash 24 can be the same as, or reference, the first hash 12). Additionally and/or alternatively, the second block 20 can include data 26 and nonce 28.

The third block 30 can follow the second block 20. The third block 30 can include a respective third hash 32 (e.g., a hash value associated with the third block 30). The third block 30 may include a third previous hash 34 (e.g., the third previous hash 34 can be the same as, or reference, the second hash 22). Additionally and/or alternatively, the third block 30 can include data 36 and nonce 38.

Additionally and/or alternatively, the fourth block 40, the nth block 60, and other potential blocks can include a respective hash, a respective previous hash, and data. The first data 16, the second data 26, the third data 36, and the data of the other blocks can include overlapping data, can differ, and/or be the same such that the data is duplicative for all blocks. In some implementations, each block can be associated with a different transaction (e.g., a different minting, a different sale, etc.). The first nonce 18, the second nonce 28, the third nonce 38, and the nonce's of the other blocks can differ and may be solved during mining.

The data in each block can include ledger data, which can include a timestamp, asset and/or cryptocurrency exchanged, actors involved in transaction, and/or a variety of other information.

In some implementations, a plurality of different blockchains can be utilized for the systems and methods disclosed herein. The different blockchains can include different configurations. The different blockchains can include parallel chains, side chains, shared blocks, differing chains, varying permissions, varying purposes, varying number of blocks, and/or varying hash functions and/or varying hashing value lengths.

In some implementations, the systems and methods can include one or more machine-learned model computing systems 900. The one or more machine-learned models can be utilized for a variety of tasks for enabling identity management.

Figure 9A:
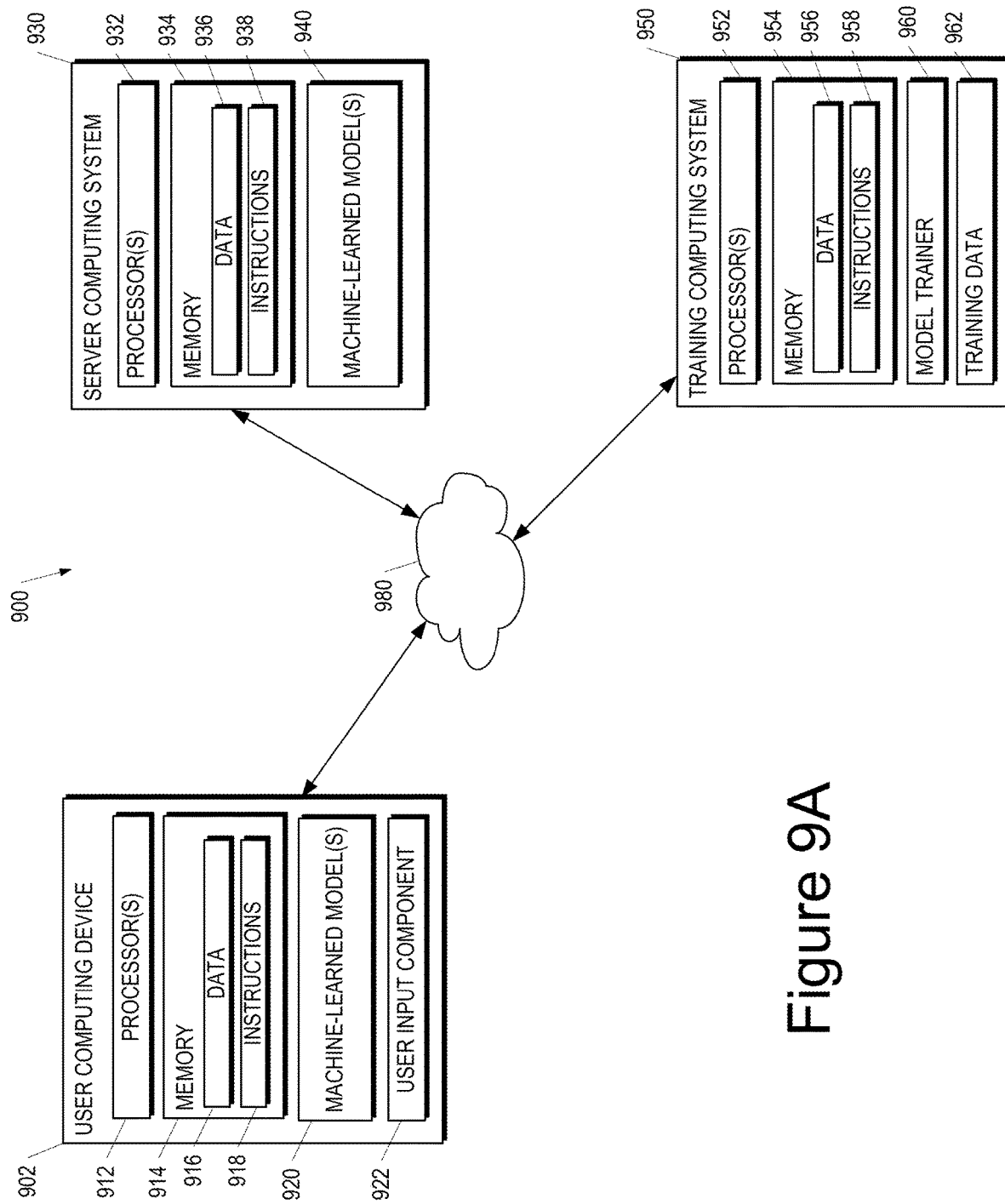
FIG. 9A depicts a block diagram of an example computing system that performs identity management according to example embodiments of the present disclosure.

FIG. 9A depicts a block diagram of an example computing system 900 that performs identity management according to example embodiments of the present disclosure. The system 900 includes a user computing device 902, a server computing system 930, and a training computing system 950 that are communicatively coupled over a network 980.

The user computing device 902 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 902 includes one or more processors 912 and a memory 914. The one or more processors 912 can be any suitable processing device (e.g., a processor core, a microprocessor, an ASIC, a FPGA, a controller, a microcontroller, etc.) and can be one processor or a plurality of processors that are operatively connected. The memory 914 can include one or more non-transitory computer-readable storage mediums, such as RAM, ROM, EEPROM, EPROM, flash memory devices, magnetic disks, etc., and combinations thereof. The memory 914 can store data 916 and instructions 918 which are executed by the processor 912 to cause the user computing device 902 to perform operations.

In some implementations, the user computing device 902 can store or include one or more identity management models 920. For example, the identity management models 920 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example identity management models 920 are discussed with reference to FIGS. 2 & 3.

In some implementations, the one or more identity management models 920 can be received from the server computing system 930 over network 980, stored in the user computing device memory 914, and then used or otherwise implemented by the one or more processors 912. In some implementations, the user computing device 902 can implement multiple parallel instances of a single identity management model 920 (e.g., to perform user-specific prediction or suggestion across multiple instances of third party service providers).

More particularly, the identity management model 920 can include one or more detection models, one or more segmentation models, one or more classification models, one or more augmentation models, one or more generation models, and/or one or more feature extractor models. The identity management model 920 can process input data to generate a suggestion and/or a prediction specific to the particular user.

Additionally or alternatively, one or more identity management models 940 can be included in or otherwise stored and implemented by the server computing system 930 that communicates with the user computing device 902 according to a client-server relationship. For example, the identity management models 940 can be implemented by the server computing system 930 as a portion of a web service (e.g., an identity management service). Thus, one or more models 920 can be stored and implemented at the user computing device 902 and/or one or more models 940 can be stored and implemented at the server computing system 930.

The user computing device 902 can also include one or more user input components 922 that receive user input. For example, the user input component 922 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 930 includes one or more processors 932 and a memory 934. The one or more processors 932 can be any suitable processing device (e.g., a processor core, a microprocessor, an ASIC, a FPGA, a controller, a microcontroller, etc.) and can be one processor or a plurality of processors that are operatively connected. The memory 934 can include one or more non-transitory computer-readable storage mediums, such as RAM, ROM, EEPROM, EPROM, flash memory devices, magnetic disks, etc., and combinations thereof. The memory 934 can store data 936 and instructions 938 which are executed by the processor 932 to cause the server computing system 930 to perform operations.

In some implementations, the server computing system 930 includes or is otherwise implemented by one or more server computing devices. In instances in which the server computing system 930 includes plural server computing devices, such server computing devices can operate according to sequential computing architectures, parallel computing architectures, or some combination thereof.

As described above, the server computing system 930 can store or otherwise include one or more machine-learned identity management models 940. For example, the models 940 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 940 are discussed with reference to FIGS. 2 & 3.

The user computing device 902 and/or the server computing system 930 can train the models 920 and/or 940 via interaction with the training computing system 950 that is communicatively coupled over the network 980. The training computing system 950 can be separate from the server computing system 930 or can be a portion of the server computing system 930.

The training computing system 950 includes one or more processors 952 and a memory 954. The one or more processors 952 can be any suitable processing device (e.g., a processor core, a microprocessor, an ASIC, a FPGA, a controller, a microcontroller, etc.) and can be one processor or a plurality of processors that are operatively connected. The memory 954 can include one or more non-transitory computer-readable storage mediums, such as RAM, ROM, EEPROM, EPROM, flash memory devices, magnetic disks, etc., and combinations thereof. The memory 954 can store data 956 and instructions 958 which are executed by the processor 952 to cause the training computing system 950 to perform operations. In some implementations, the training computing system 950 includes or is otherwise implemented by one or more server computing devices.

The training computing system 950 can include a model trainer 960 that trains the machine-learned models 920 and/or 940 stored at the user computing device 902 and/or the server computing system 930 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 960 can perform a number of generalization techniques (e.g., weight decays, dropouts, etc.) to improve the generalization capability of the models being trained.

In particular, the model trainer 960 can train the identity management models 920 and/or 940 based on a set of training data 962. The training data 962 can include, for example, training blockchain data, training web page data, training transaction data, ground truth labels, ground truth information, and/or ground truth segmentation masks.

In some implementations, if the user has provided consent, the training examples can be provided by the user computing device 902. Thus, in such implementations, the model 920 provided to the user computing device 902 can be trained by the training computing system 950 on user-specific data received from the user computing device 902. In some instances, this process can be referred to as personalizing the model.

The model trainer 960 includes computer logic utilized to provide desired functionality. The model trainer 960 can be implemented in hardware, firmware, and/or software controlling a general purpose processor. For example, in some implementations, the model trainer 960 includes program files stored on a storage device, loaded into a memory and executed by one or more processors. In other implementations, the model trainer 960 includes one or more sets of computer-executable instructions that are stored in a tangible computer-readable storage medium such as RAM hard disk or optical or magnetic media.

The network 980 can be any type of communications network, such as a local area network (e.g., intranet), wide area network (e.g., Internet), or some combination thereof and can include any number of wired or wireless links. In general, communication over the network 980 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some cases, the machine-learned model(s) can be configured to perform a task that includes encoding input data for reliable and/or efficient transmission or storage (and/or corresponding decoding). For example, the task may be audio compression task. The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data, and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 9A illustrates one example computing system that can be used to implement the present disclosure. Other computing systems can be used as well. For example, in some implementations, the user computing device 902 can include the model trainer 960 and the training dataset 962. In such implementations, the models 920 can be both trained and used locally at the user computing device 902. In some of such implementations, the user computing device 902 can implement the model trainer 960 to personalize the models 920 based on user-specific data.

Figure 9B:
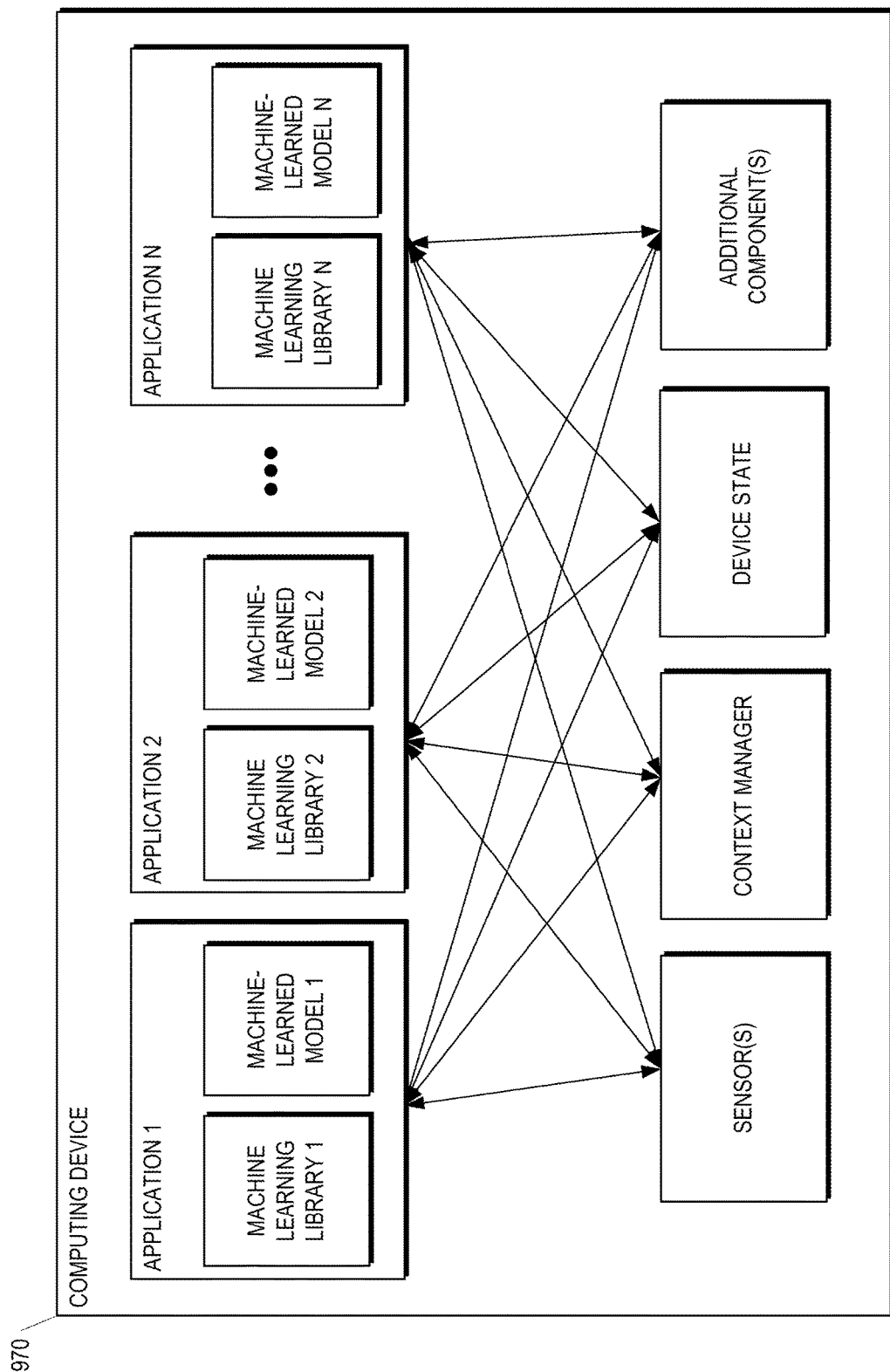
FIG. 9B depicts a block diagram of an example computing device that performs identity management according to example embodiments of the present disclosure.

FIG. 9B depicts a block diagram of an example computing device 970 that performs according to example embodiments of the present disclosure. The computing device 970 can be a user computing device or a server computing device.

The computing device 970 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 9B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 9C:
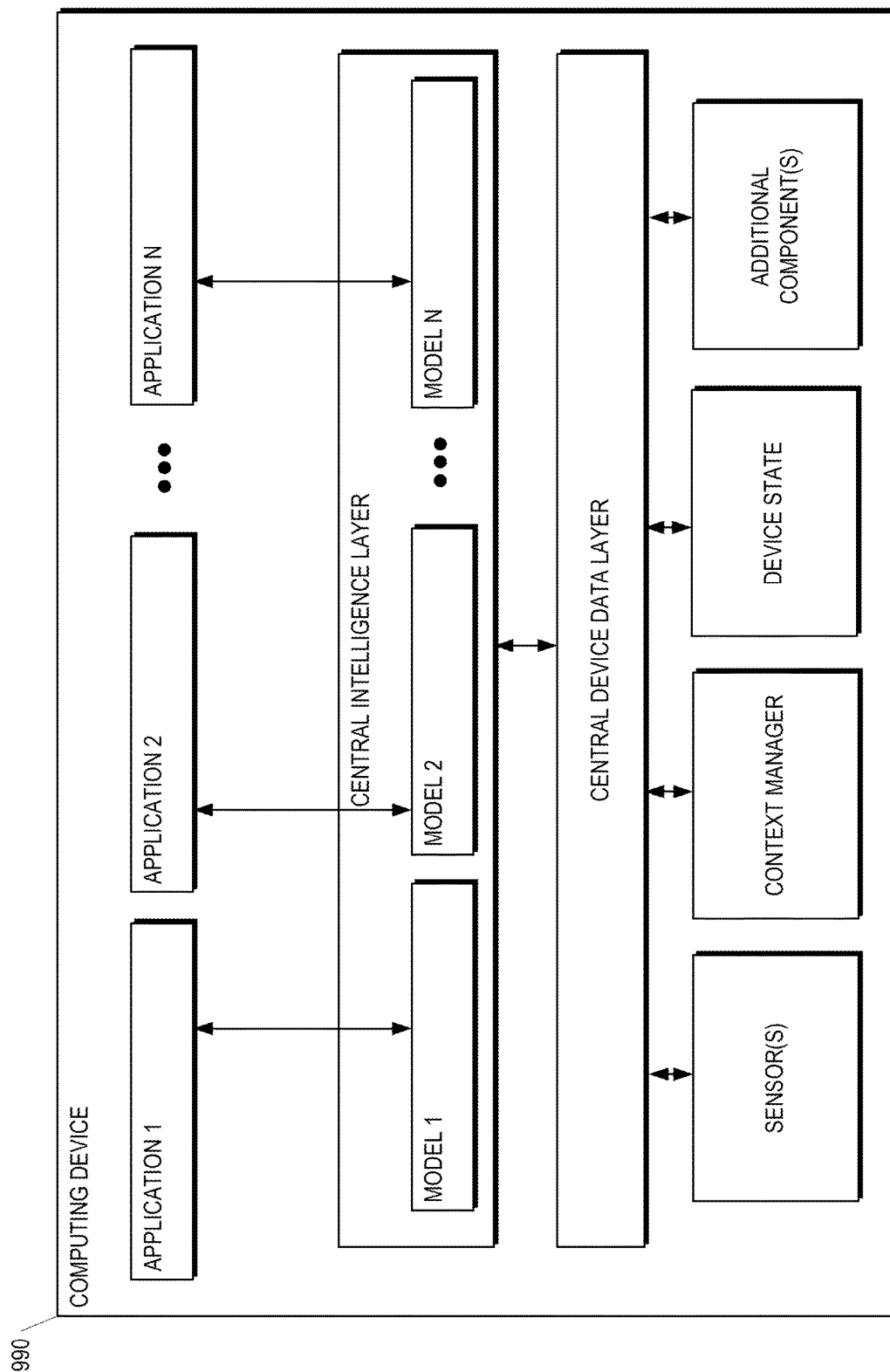
FIG. 9C depicts a block diagram of an example computing system that performs identity management according to example embodiments of the present disclosure.

FIG. 9C depicts a block diagram of an example computing device 990 that performs according to example embodiments of the present disclosure. The computing device 990 can be a user computing device or a server computing device.

The computing device 990 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 9C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 990.

The central intelligence layer can communicate with a central device data layer. The central device data layer can be a centralized repository of data for the computing device 990. As illustrated in FIG. 9C, the central device data layer can communicate with a number of other components of the computing device, such as, for example, one or more sensors, a context manager, a device state component, and/or additional components. In some implementations, the central device data layer can communicate with each device component using an API (e.g., a private API).

Example System Arrangements

Figure 2:
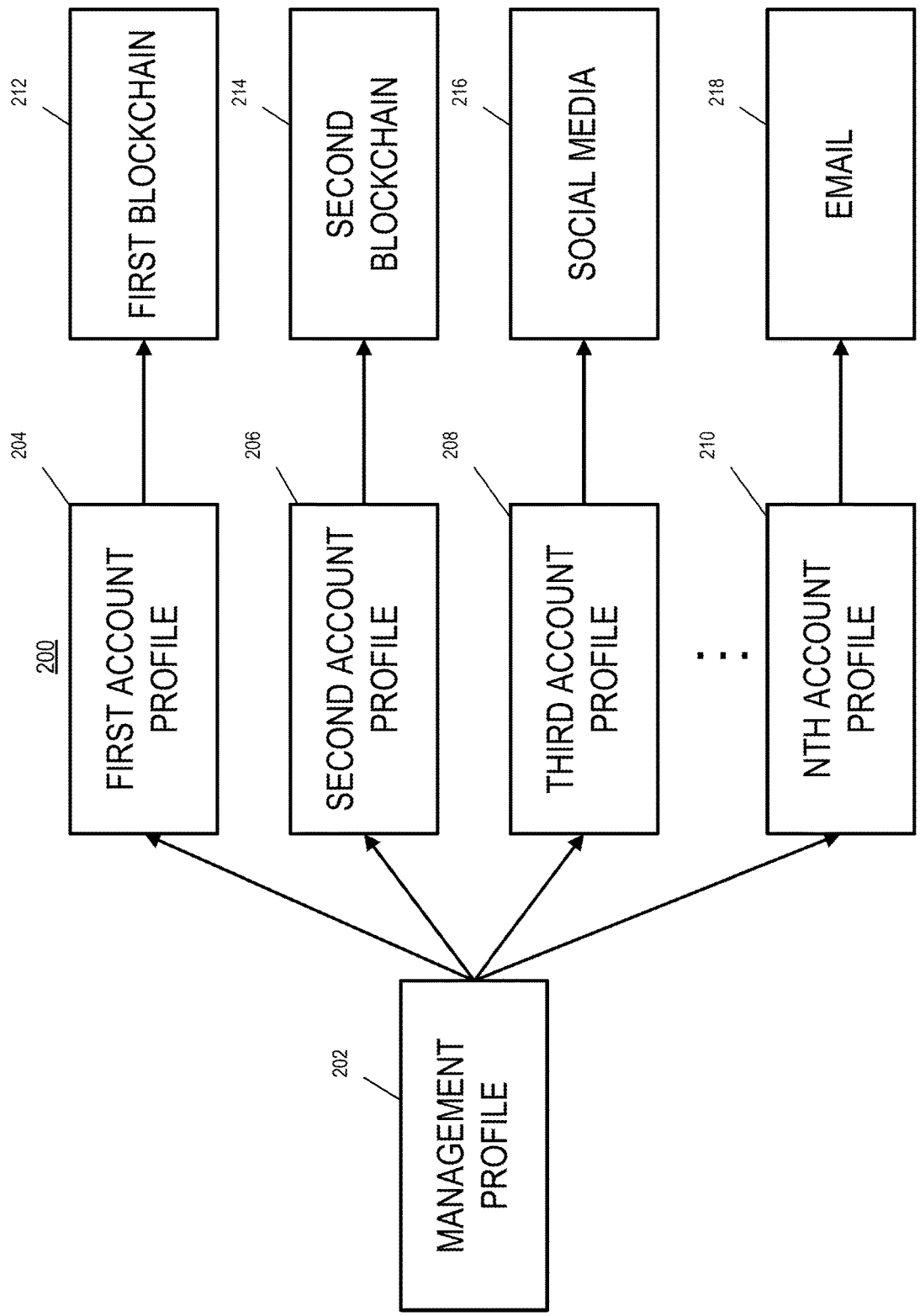
FIG. 2 depicts a block diagram of an example profile management system according to example embodiments of the present disclosure.

FIG. 2 depicts a block diagram of an example profile management system 200 according to example embodiments of the present disclosure. In some implementations, the profile management system 200 can be configured to store and/or manage one or more management profile datasets 202 descriptive of a plurality of account profiles associated with a plurality of users and, as a result of the management of a management profile dataset 202, provide access to a plurality of web platforms including a first blockchain 212, a second blockchain 214, a social media platform 216, and/or an email platform 218. Thus, in some implementations, the profile management system 200 can include a plurality of account profiles including a first account profile dataset 204, a second account profile dataset 206, a third account profile dataset 208, and/or an nth account profile dataset 210.

In particular, the profile management system 200 can manage one or more management profile datasets 202 associated with one or more users (e.g., a plurality of management profile datasets in which each of the management profile datasets is associated with a different user). The management profile dataset 202 can include a plurality of account profile datasets associated with a plurality of different platforms. For example, a user can have a plurality of accounts associated with the plurality of different platforms. Therefore, the first account profile dataset 204 can be utilized to access an account for the first blockchain 212. Additionally and/or alternatively, the second account profile dataset 206 can be utilized to access an account for the second blockchain 214. The third account profile dataset 208 can be utilized to access an account for a social media platform 216. In some implementations, the nth account profile dataset 210 can be utilized to access an account for an email platform 218.

Figure 3:
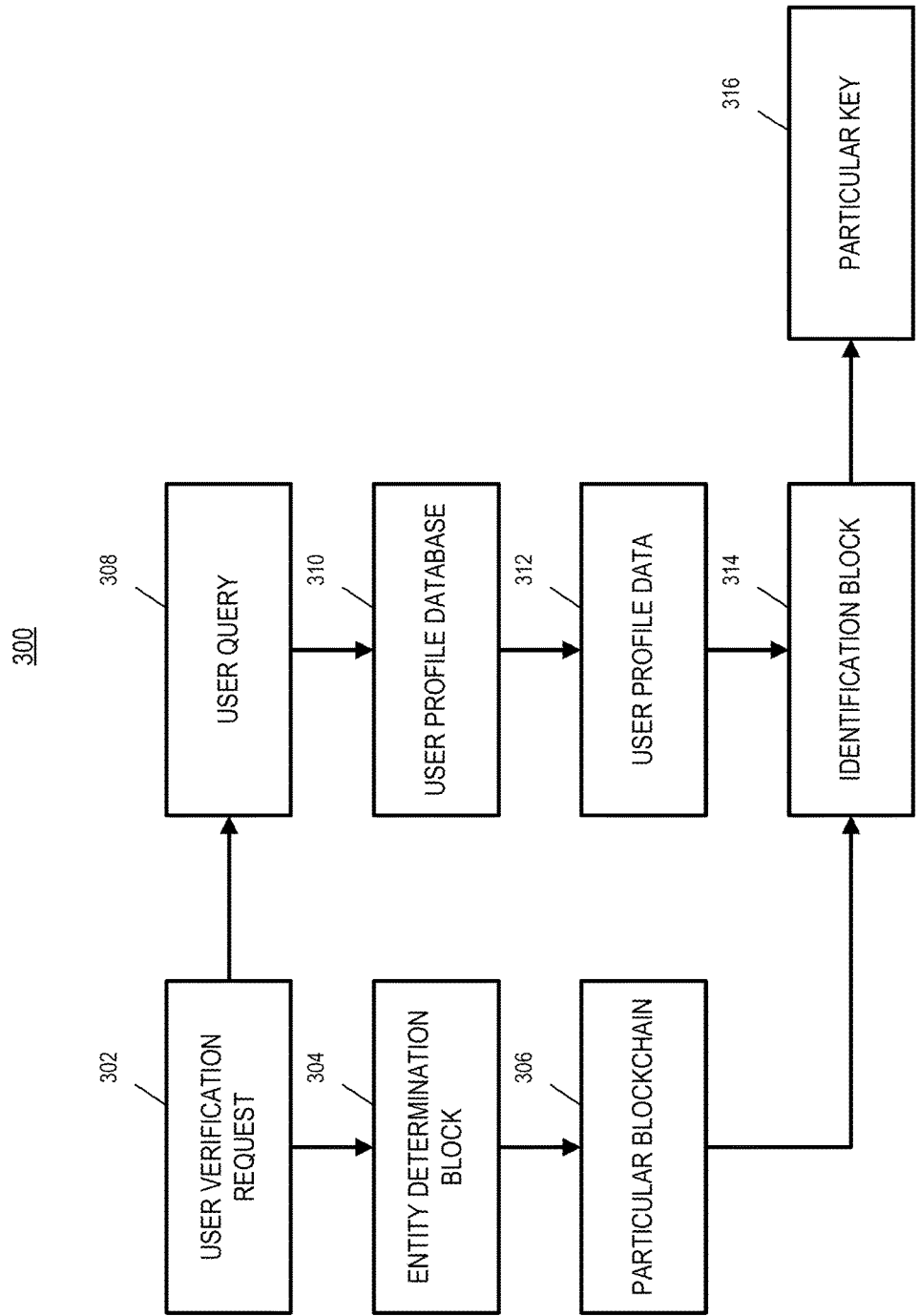
FIG. 3 depicts a block diagram of an example key determination system according to example embodiments of the present disclosure.

FIG. 3 depicts a block diagram of an example key determination system 300 according to example embodiments of the present disclosure. In particular, the key determination system 300 can process a user verification request 302 to determine a particular key 316 to provide authenticated access to a blockchain.

For example, a user verification request 302 can be obtained by the profile management system. The user verification request 302 can be processed by an entity determination block 304 to determine a particular blockchain 306 associated with the user verification request. The entity determination block 304 can determine a portion of the user verification request 302 is associated with a particular domain, web address, and/or platform. The particular blockchain 306 can be determined based on the particular domain, web address, and/or platform.

Additionally and/or alternatively, a user query 308 can be generated based on the user verification request 302. The user query 308 can be descriptive of the particular user associated with the user verification request 302. The user query 308 can be utilized to query the user profile database 310 to obtain the user profile data 312 associated with the particular user requesting access to the platform.

The particular blockchain 306 and the user profile data 312 can be processed by the identification block 314 to determine the particular key 316 associated with the particular blockchain 306 and the user. The identification block 314 can determine a subset of the user profile data 312 is associated with the particular blockchain 306. The subset of the user profile data 312 can be parsed to obtain the particular key 316. The parsing may include detecting a key in the subset of the user profile data 312 and segmenting the particular key 316 from the other data. The particular key 316 may be identified based on a particular data structure.

Figure 4:
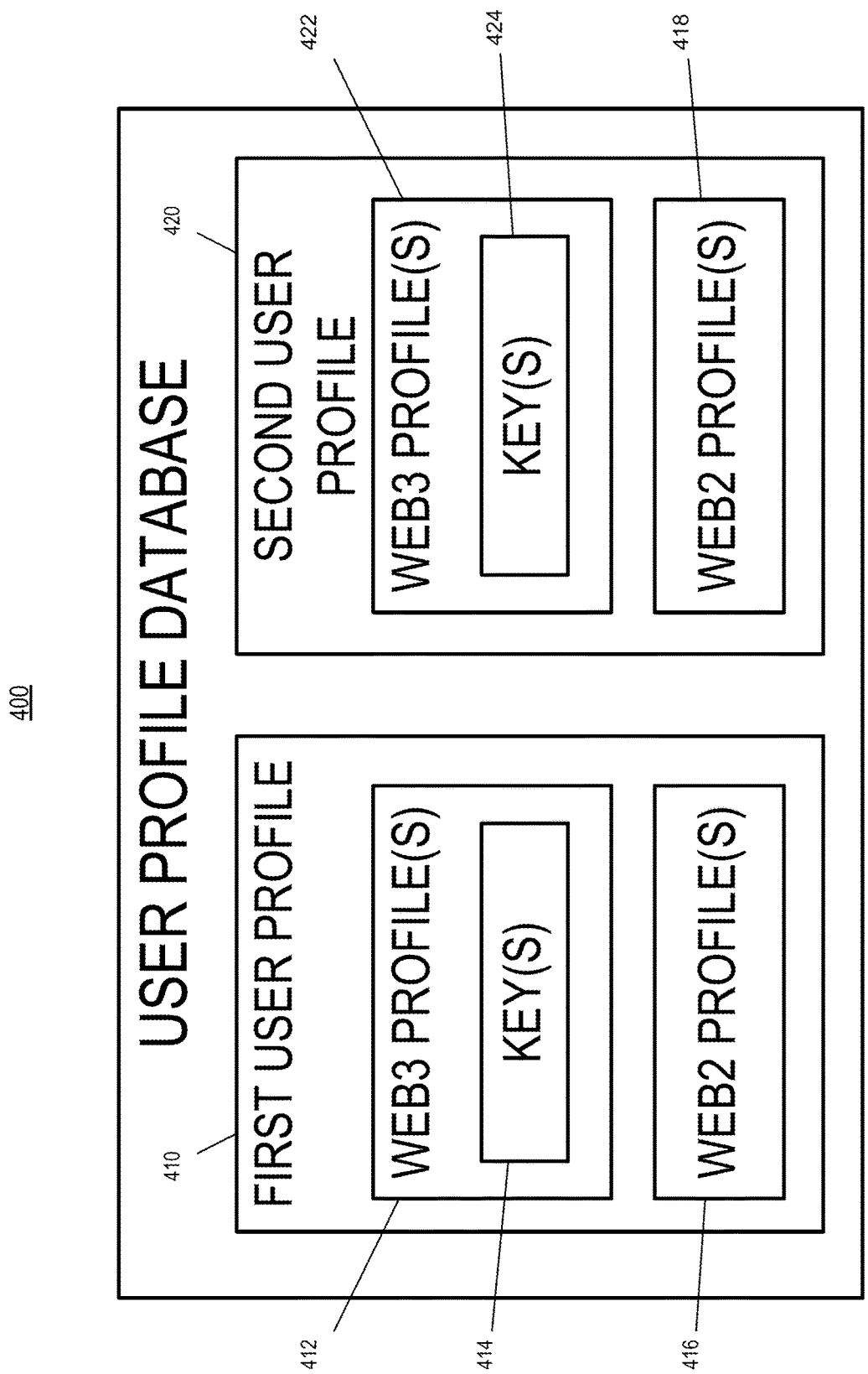
FIG. 4 depicts a block diagram of an example user profile database according to example embodiments of the present disclosure.

FIG. 4 depicts a block diagram of an example user profile database 400 according to example embodiments of the present disclosure. In particular, the user profile database 400 can be utilized to store a plurality of user profile datasets associated with a plurality of different users. For example, the user profile database 400 can store a first user profile dataset 410 associated with a first user and a second user profile dataset 420 associated with a second user. The first user profile dataset 410 can include data associated with one or more Web3 profiles 412, which can include one or more keys 414 associated with the one or more Web3 profiles 412. Additionally and/or alternatively, the first user profile dataset 410 can include data associated with one or more Web2 profiles 416. The one or more Web3 profiles 412 and the one or more Web2 profiles 416 can be associated with the first user.

The second user profile dataset 420 can include data associated with one or more Web3 profiles 422, which can include one or more keys 424 associated with the one or more Web3 profiles 422. Additionally and/or alternatively, the second user profile dataset 420 can include data associated with one or more Web2 profiles 426. The one or more Web3 profiles 422 and the one or more Web2 profiles 426 can be associated with the second user.

Figure 5:
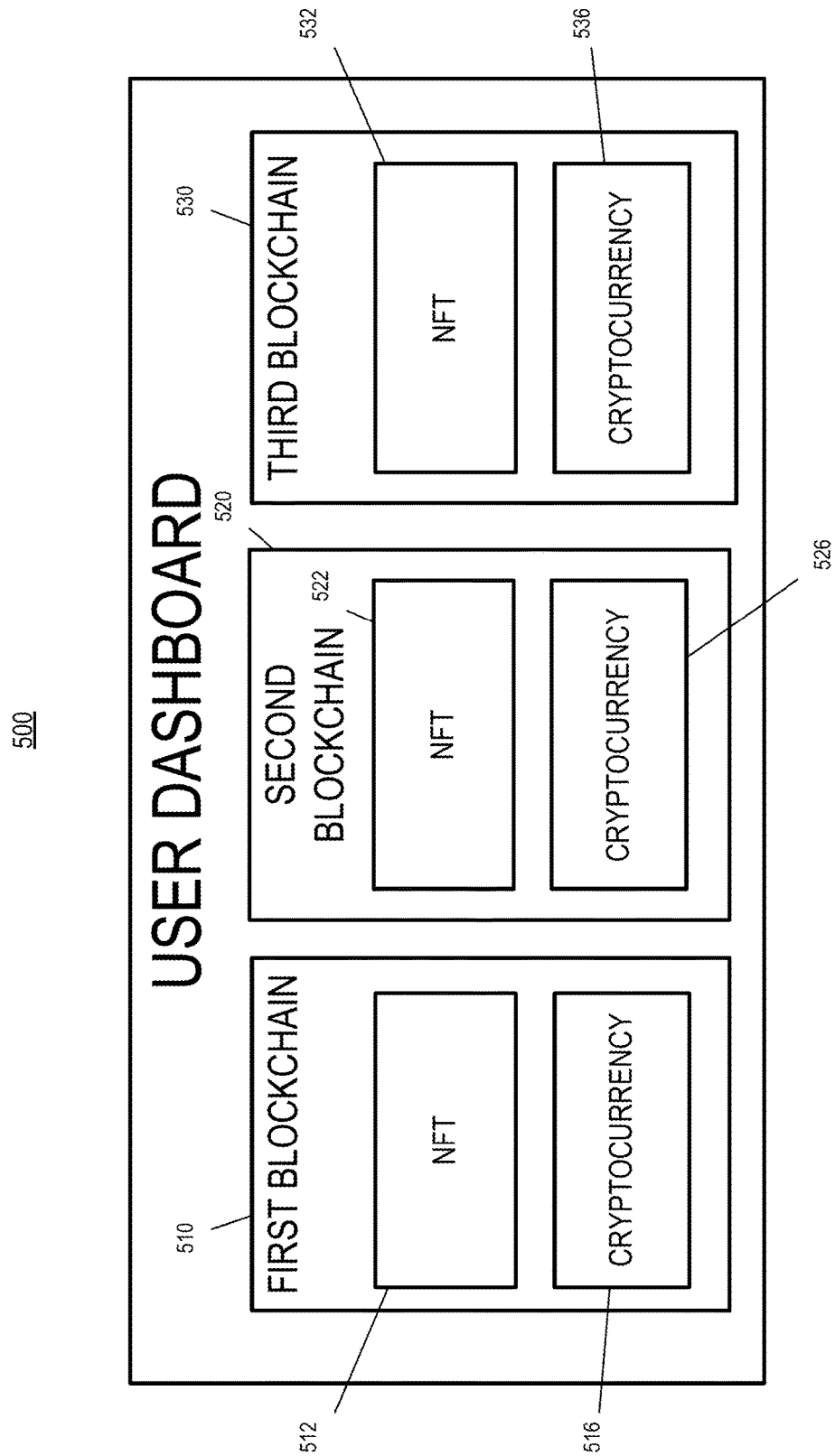
FIG. 5 depicts a block diagram of an example user dashboard according to example embodiments of the present disclosure.

FIG. 5 depicts a block diagram of an example user dashboard 500 according to example embodiments of the present disclosure. In particular, the user dashboard 500 can provide a display interface for a user to view their assets across different platforms. The user dashboard 500 can include different panels for displaying the different assets with other assets from the same community and/or from the same blockchain. Alternatively and/or additionally, the user dashboard 500 can provide the different assets for display together and/or via another display categorization (e.g., alphabetically, the type of digital asset (e.g., image, video, audio, etc.).

For example, the user dashboard 500 can include a first panel for a first blockchain 510, a second panel for the second blockchain 520, and/or a third panel for the third blockchain 530. One or more first non-fungible tokens 512 associated with the first blockchain 510 owned by the user can be provided for display in the first panel. Additionally and/or alternatively, data associated with a user first cryptocurrency balance 516 associated with the first blockchain 510 can be provided for display in the first panel.

One or more second non-fungible tokens 522 associated with the second blockchain 520 owned by the user can be provided for display in the second panel. Additionally and/or alternatively, data associated with a user second cryptocurrency balance 526 associated with the second blockchain 520 can be provided for display in the second panel.

One or more third non-fungible tokens 532 associated with third blockchain 530 owned by the user can be provided for display in the third panel. Additionally and/or alternatively, data associated with a user third cryptocurrency balance 536 associated with the third blockchain 530 can be provided for display in the third panel.

Example Methods

Figure 6:
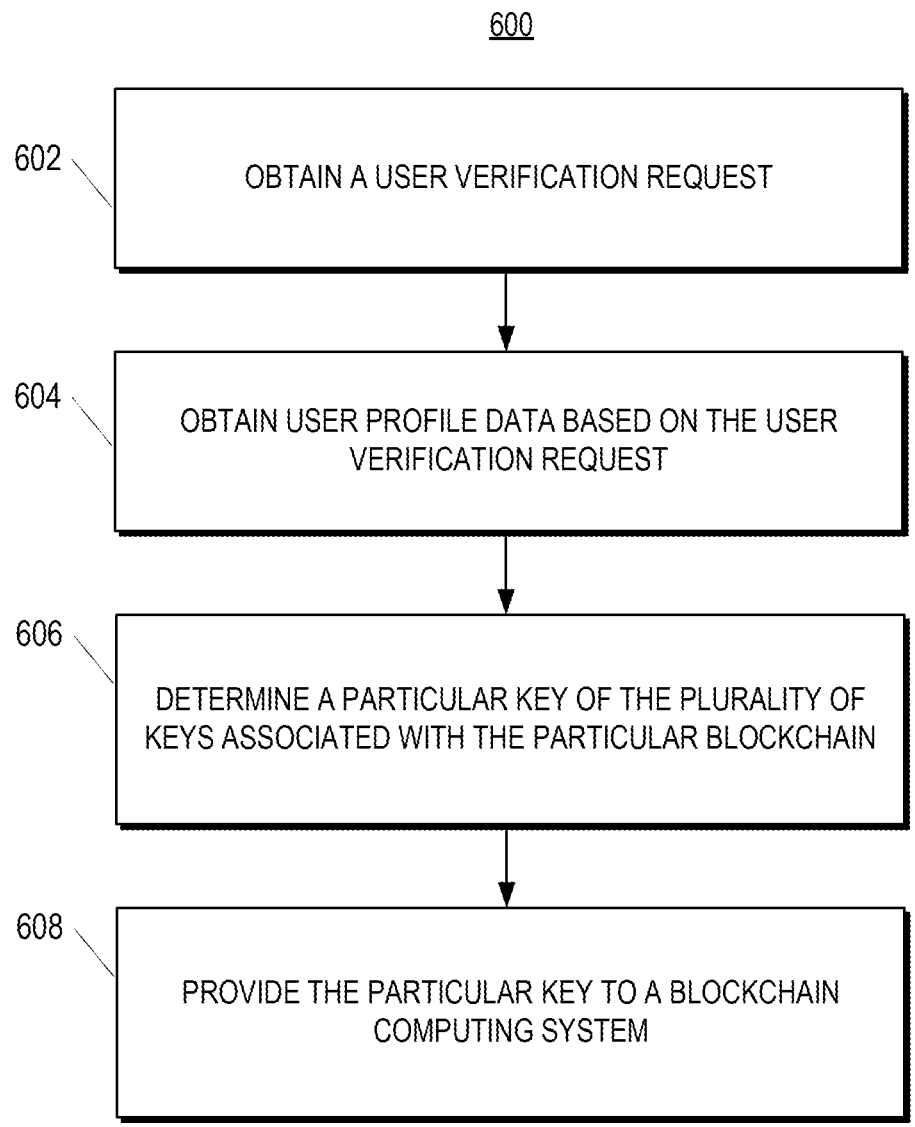
FIG. 6 depicts a flow chart diagram of an example method to perform user verification according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain a user verification request. The user verification request can be associated with a particular blockchain of a plurality of different blockchains. In some implementations, obtaining the user verification request can be based on providing input data to a blockchain computing system. The user verification request can be obtained from a blockchain computing system. Alternatively and/or additionally, the user verification request may be obtained from a blockchain computing system. The user verification request can be descriptive of a request for one or more particular keys associated with a particular blockchain. Additionally and/or alternatively, the user verification request can include a request for account information (e.g., an account ID, a username, an email, a password, a hash, and/or an IP address).

At 604, the computing system can obtain user profile data based on the user verification request. The user profile data can be associated with a particular user. In some implementations, the user profile data can include a plurality of keys associated with the plurality of different blockchains. The user profile data can be stored by a server computing system. In some implementations, the user verification request can be obtained via a web browser application. Additionally and/or alternatively, providing the particular key can include providing the particular key via an application extension. The application extension can be a browser extension that interfaces with a browser application. Alternatively and/or additionally, providing the particular key can include instructing an application programming interface to interface with the particular blockchain. In some implementations, the user profile data can include login information for a plurality of web platforms. The user profile data can be managed by a profile management system that facilitates the storage, retrieval, and transmission of one or more private keys. In some implementations, the plurality of keys can be stored with one or more cryptographic techniques.

In some implementations, obtaining the user profile data based on the user verification request can include accessing a user profile database. The user profile database can include profile information for a plurality of different users. Additionally and/or alternatively, the user profile database can be accessed via a profile management system. The profile management system can include an intermediary system for obtaining user information and interacting with a plurality of different web platforms and/or account services.

At 606, the computing system can determine a particular key of the plurality of keys associated with the particular blockchain. Determining the particular key can include processing the user profile data to determine a subset of the user profile data that is associated with the particular blockchain. The subset of the user profile data can then be processed to identify the particular key. In some implementations, the determination can be performed by a machine-learned model. Alternatively and/or additionally, the determination can be performed based on one or more deterministic functions and/or heuristics. The identification can be based on the data structure associated with the particular key and/or based on one or more annotations or indexing techniques.

In some implementations, determining the particular key of the plurality of keys associated with the particular blockchain can include determining the particular blockchain based on the user verification request and determining the particular key based on the particular blockchain.

At 608, the computing system can provide the particular key to a blockchain computing system. The blockchain computing system can be associated with the particular blockchain. Providing the particular key can include causing an application programming interface to interface with the blockchain computing system.

In some implementations, the systems and methods can include obtaining blockchain data from the blockchain computing system in response to providing the particular key to the blockchain computing system. The blockchain data may be obtained via an application programming interface and/or via a blockchain node.

Alternatively and/or additionally, the systems and methods can include obtaining one or more user inputs. The systems and methods can determine the one or more user inputs are associated with a blockchain transaction request. The blockchain transaction request can be provided to the blockchain computing system. Transaction data can then be obtained in response to providing the particular key and the blockchain transaction request.

Figure 7:
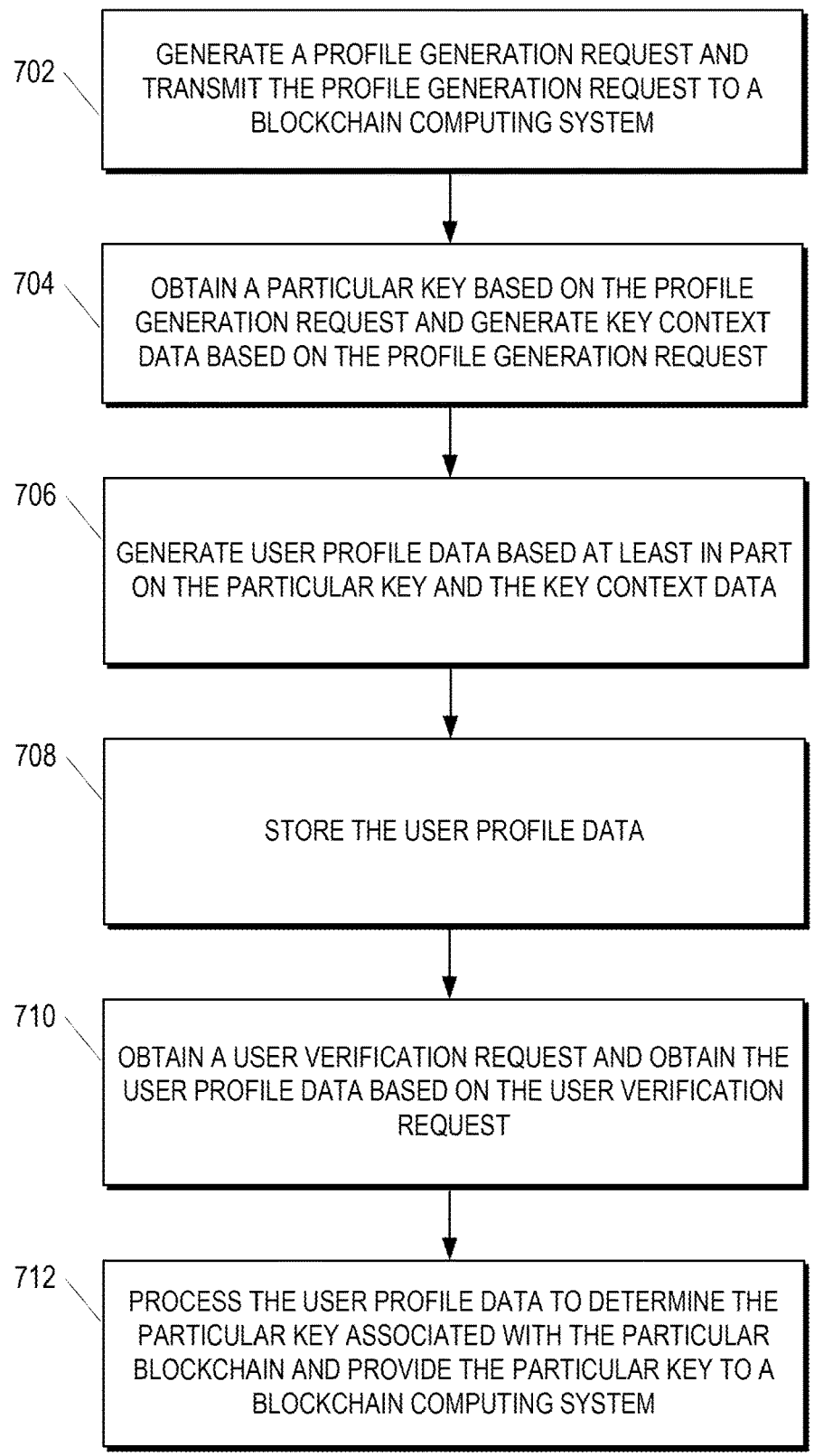
FIG. 7 depicts a flow chart diagram of an example method to perform profile generation according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can generate a profile generation request and transmit the profile generation request to a blockchain computing system. The profile generation request can be generated in response to a user interacting with a third party platform for the first time. For example, a user can request to interact with a new blockchain (e.g., requests to set-up a smart contract and/or requests to trigger a smart contract on the blockchain). Generating the profile generation request can include causing one or more application programming interfaces to process a profile generation page associated with the web platform, to determine the criteria requested by the web platform, to obtain the criteria data for the particular user, and to generate the profile generation request based on the obtained criteria data. The transmission of the data to the blockchain computing system can include providing an intermediary system that interfaces with the profile generation page to input the obtained criteria data into the one or more input fields.

At 704, the computing system can obtain a particular key based on the profile generation request and generate key context data based on the profile generation request. The particular key can be a key associated with the particular blockchain (e.g., a private key and/or a public key for accessing the blockchain assets associated with the particular user). The key context data can include one or more hashes, one or more identifiers associated with the particular blockchain (e.g., one or more labels and/or one or more annotations), and/or one or more token IDs.

At 706, the computing system can generate user profile data based at least in part on the particular key and the key context data. The user profile data can be structured to be parsed in order to obtain relevant data based on the type of data.

At 708, the computing system can store the user profile data. The user profile data can be stored in a user profile database. The user profile database can include user profile data for a plurality of users.

At 710, the computing system can obtain a user verification request and obtain the user profile data based on the user verification request. The user verification request can be associated with a particular blockchain. The user verification request can be associated with a login portal associated with the particular blockchain. In some implementations, the user verification request can be generated based on the detection of one or more input fields in the login portal. The user verification request can be descriptive of a request for an input for each of the one or more input fields.

In some implementations, the user profile data can be associated with a particular user. In some implementations, the user profile data can include a plurality of identification datasets associated with the plurality of different web platforms. The plurality of different web platforms can include a plurality of different blockchain platforms. In some implementations, the plurality of different web platforms can include one or more social media platforms. Additionally and/or alternatively, each identification dataset of the plurality of identification datasets can include login information associated with a respective web platform. An identification dataset associated with a blockchain can include one or more keys (e.g., one or more private keys and/or one or more public keys), one or more token IDs, one or more hashes, and/or one or more asset-specific datasets (e.g., data associated with non-fungible tokens and/or cryptocurrency). Additionally and/or alternatively, the user profile data can include an email address and/or other communication data. The email address and/or the other communication data can be leveraged for one or more users to email other users associated with a particular non-fungible token community. The communication data can therefore be leveraged for community building.

In some implementations, a profile management system can provide a communication interface that obtains communication requests from a first user, determines an intended audience, obtains communication data associated with the intended audience (e.g., one or more second users), and provides a communication notification to the intended audience. The communication can be performed without revealing the communication data of the first user or the one or more second users. The profile management system can therefore keep the communication data private, while still allowing users to build a community.

At 712, the computing system can process the user profile data to determine the particular key associated with the particular blockchain and provide the particular key to a blockchain computing system. In some implementations, processing the user profile data to determine the particular key associated with the particular blockchain can include determining a particular identification dataset of the plurality of identification datasets associated with the particular blockchain and obtaining the particular key associated with the particular identification dataset.

In some implementations, the blockchain computing system can be associated with the particular blockchain. The particular key may be a private key. Alternatively and/or additionally, the particular key may be a public key. Providing the particular key can include an intermediary system interfacing with the blockchain as the user interacts with an abstracted (and/or obfuscated) user interface associated with the profile management system.

In some implementations, the systems and methods can transmit a profile generation request to the blockchain computing system. The particular key can be obtained based on the profile generation request. Key context data can then be generated based on the profile generation request. In some implementations, the key context data can be descriptive of the particular blockchain and login information associated with the particular blockchain. The user profile data can then be generated based at least in part on the particular key and the key context data. The user profile data can then be stored.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a user verification request. The user verification request can be associated with a particular blockchain of a plurality of different blockchains. The particular blockchain can be a decentralized and distributed public blockchain for storing smart contracts associated with a plurality of non-fungible tokens.

At 804, the computing system can obtain user profile data based on the user verification request. The user profile data can be associated with a particular user. In some implementations, the user profile data can be managed with a profile management extension. Additionally and/or alternatively, the user profile data can include a plurality of blockchain profile datasets associated with the plurality of different blockchains. The profile management extension can be a web browser application extension. In some implementations, the profile management extension can be associated with the user profile database. The profile management extension can be associated with one or more application programming interfaces. The one or more application programming interfaces can interact with a user interface of a blockchain interface. Additionally and/or alternatively, the user profile data can include a plurality of crypto wallets. Each of the plurality of crypto wallets can include access data associated with at least one of a cryptocurrency balance or a plurality of non-fungible tokens.

At 806, the computing system can process the user profile data to determine a particular key associated with the particular blockchain and provide the particular key to a blockchain computing system. The particular key can be associated with a particular blockchain profile dataset of the plurality of blockchain profile datasets. The particular blockchain profile dataset can include account information associated with the particular blockchain. The account information can include the particular key. Additionally and/or alternatively, the user profile data can include data associated with a plurality of non-fungible tokens associated with a plurality of different blockchains.

In some implementations, the blockchain computing system can be associated with the particular blockchain. Blockchain data can then be obtained in response to providing the particular key. In some implementations, the blockchain data can include information about the Web3 assets of the particular user.

At 808, the computing system can obtain one or more user inputs and determine the one or more user inputs are associated with a blockchain transaction request. The one or more user inputs can be obtained via one or more selections to a user interface. The user interface may be associated with the blockchain. Alternatively and/or additionally, the user interface may be provided by the profile management system as part of an intermediary system.

At 810, the computing system can provide the blockchain transaction request to the blockchain computing system. Providing the blockchain transaction request can include triggering the transfer of a payload of a smart contract.

At 812, the computing system can obtain transaction data in response to providing the particular key and the blockchain transaction request. The transaction data can include data associated with a non-fungible token transaction. Additionally and/or alternatively, the transaction data can include data associated with a cryptocurrency transaction.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, the system comprising:
one or more processors; and
one or more non-transitory computer-readable media that collectively store instructions that, when executed by the one or more processors, cause the computing system to perform operations, the operations comprising:
obtaining a user verification request, wherein the user verification request is associated with a particular blockchain of a plurality of different blockchains;
obtaining user profile data based on the user verification request, wherein the user profile data is associated with a particular user, and wherein the user profile data comprises a plurality of keys associated with the plurality of different blockchains;
determining a particular key of the plurality of keys associated with the particular blockchain; and
providing the particular key to a blockchain computing system, wherein the blockchain computing system is associated with the particular blockchain.

2. The system of claim 1, wherein the operations further comprise:
in response to providing the particular key to the blockchain computing system, obtaining blockchain data from the blockchain computing system.

3. The system of claim 1, wherein the user profile data is stored by a server computing system, wherein the user verification request is obtained via a web browser application, and wherein providing the particular key comprises providing the particular key via an application extension.

4. The system of claim 1, wherein the operations further comprise:
obtaining one or more user inputs;
determining the one or more user inputs are associated a blockchain transaction request;
providing the blockchain transaction request to the blockchain computing system; and
obtaining transaction data in response to providing the particular key and the blockchain transaction request.

5. The system of claim 1, wherein the user profile data comprises login information for a plurality of web platforms.

6. The system of claim 1, wherein the user profile data is managed by a profile management system that facilitates the storage, retrieval, and transmission of one or more private keys.

7. The system of claim 1, wherein the plurality of keys are stored with one or more cryptographic techniques.

8. The system of claim 1, wherein obtaining the user verification request is based on providing input data to a blockchain computing system.

9. The system of claim 1, wherein obtaining the user profile data based on the user verification request comprises:
   accessing a user profile database, wherein the user profile database comprises profile information for a plurality of different users.

10. The system of claim 1, wherein determining the particular key of the plurality of keys associated with the particular blockchain comprises:
   determining the particular blockchain based on the user verification request; and
   determining the particular key based on the particular blockchain.

* * * * *